UNITED STATES PATENT OFFICE.

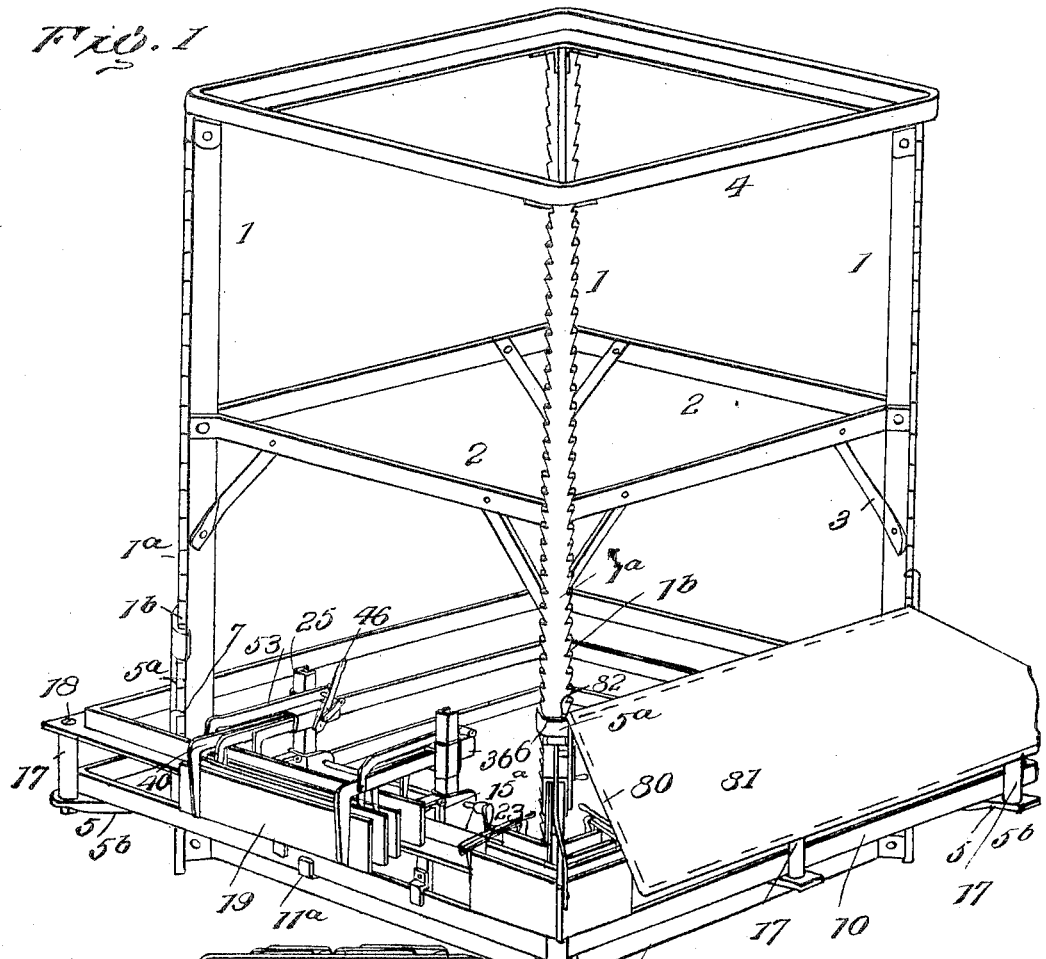

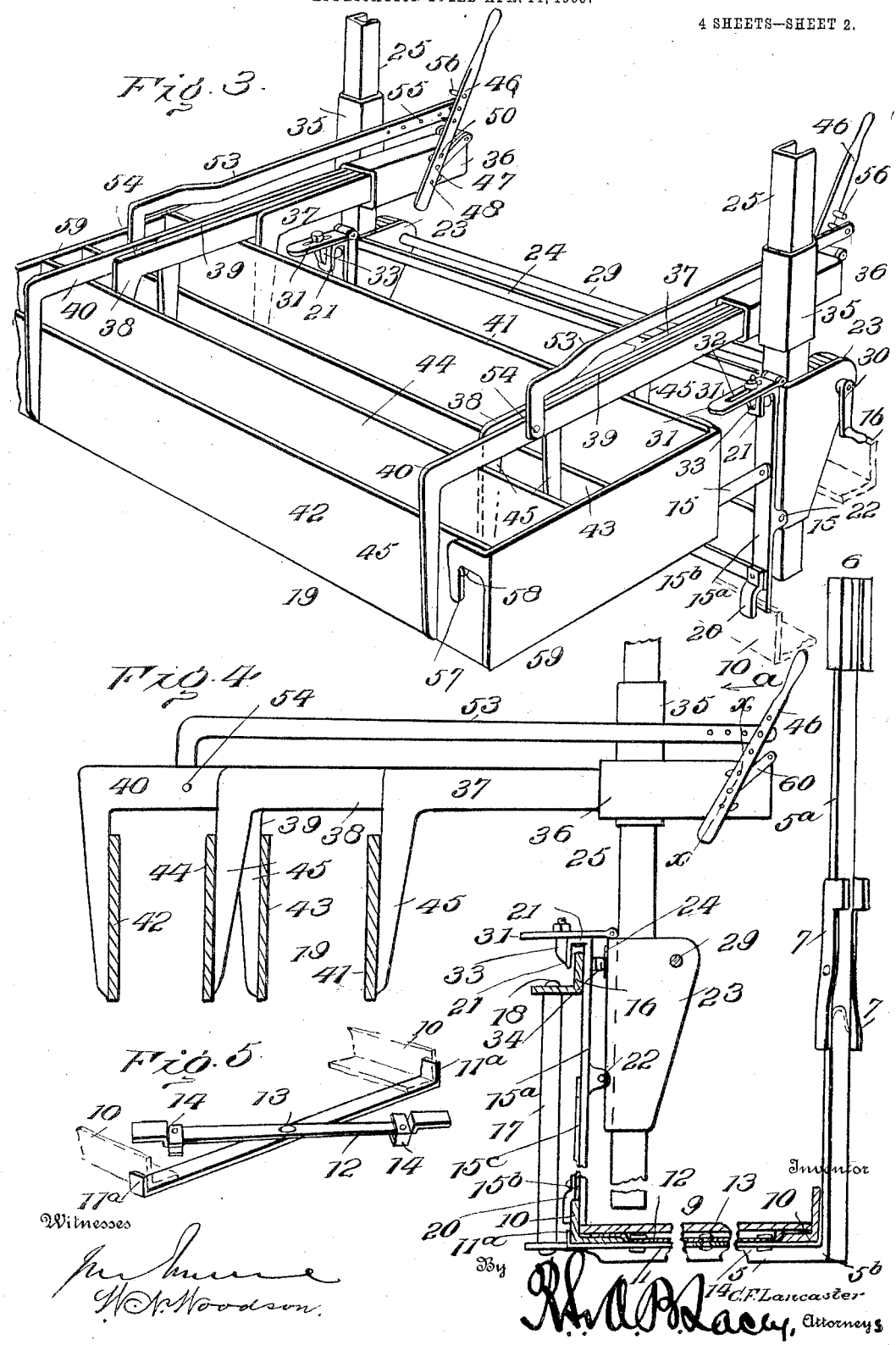

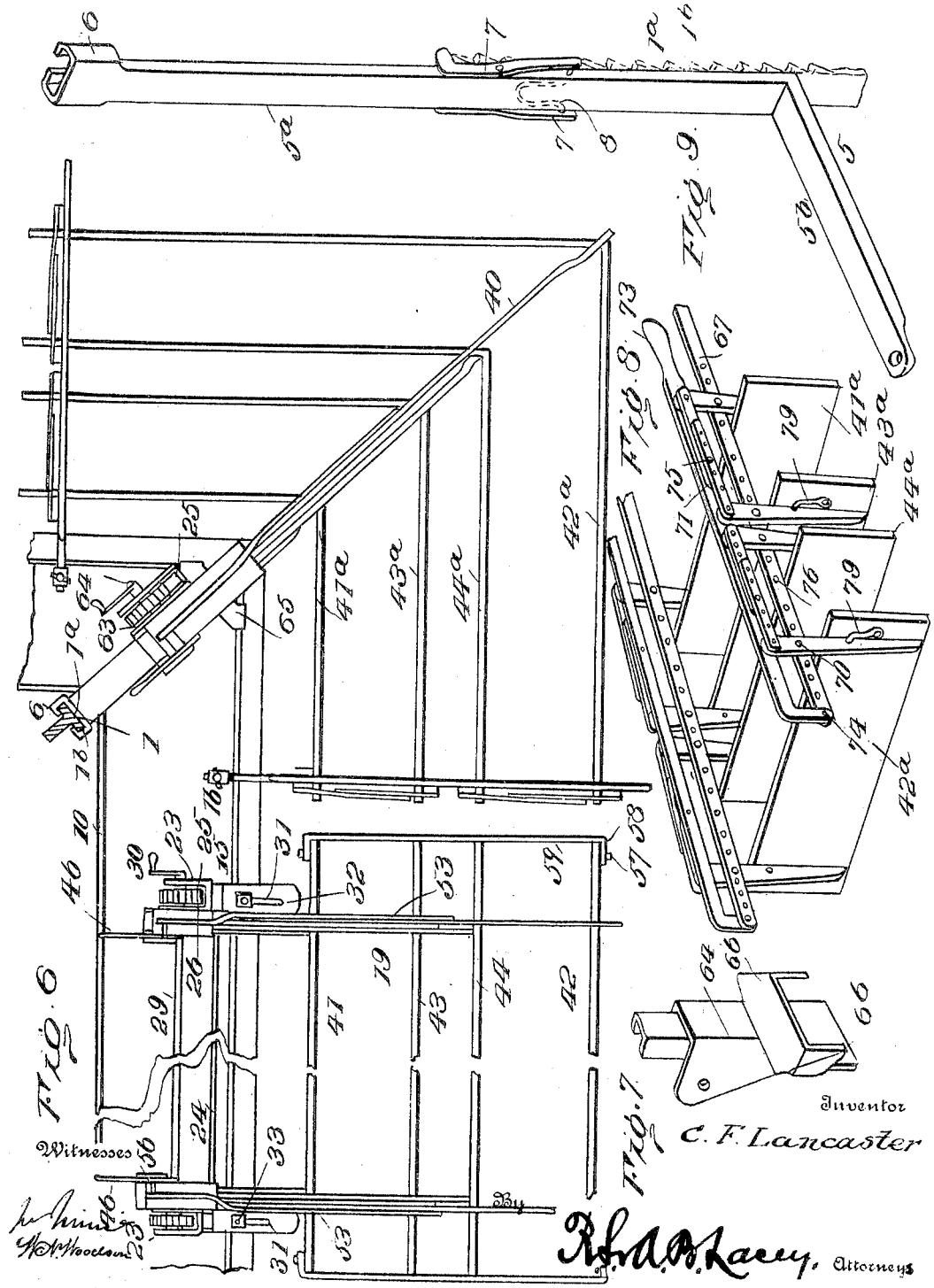

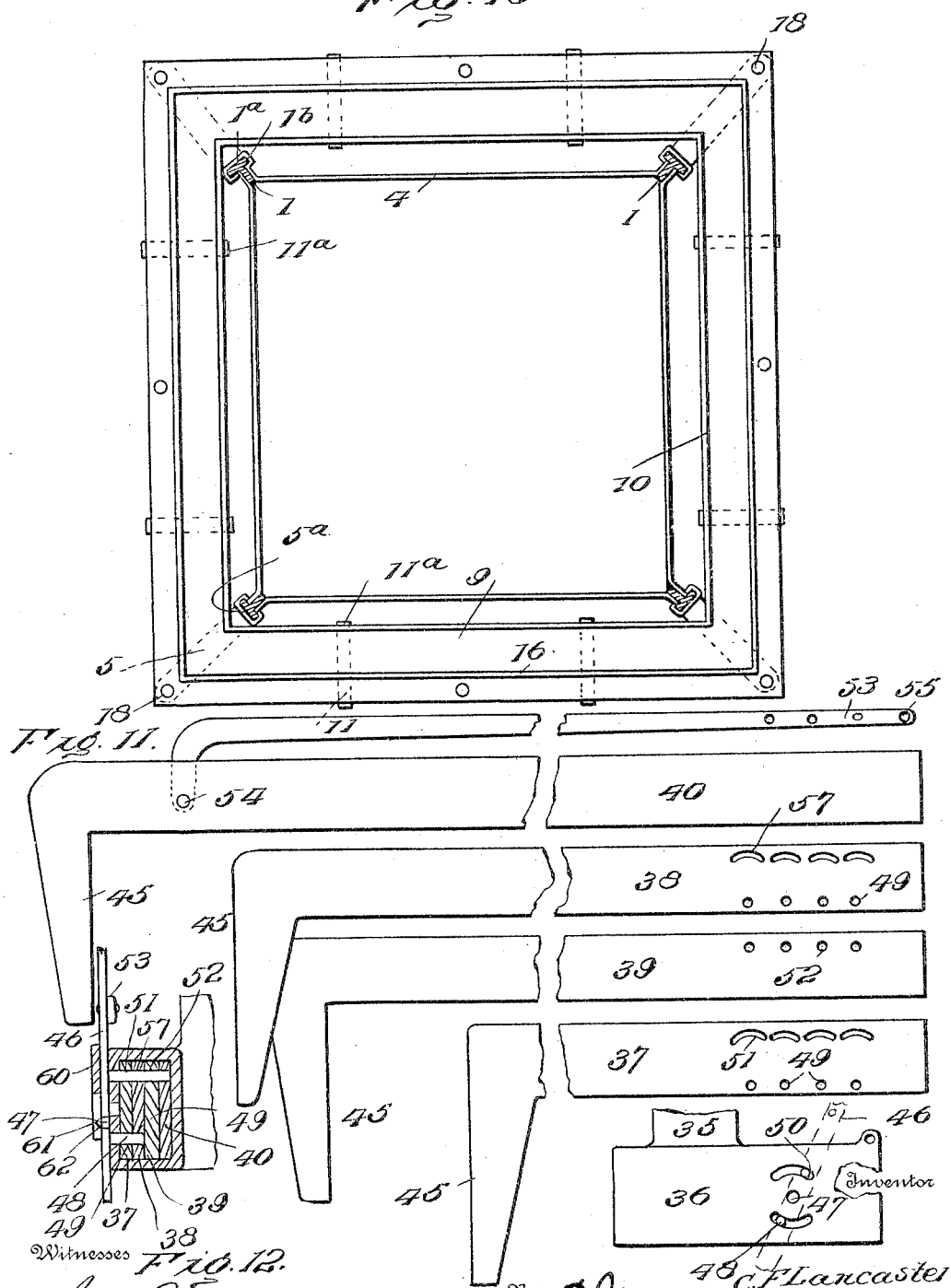

CHARLES F. LANCASTER, OF PETOSKEY, MICHIGAN.

MOLDING APPARATUS.

No. 802,699.     Specification of Letters Patent.     Patented Oct. 24, 1905.

Application filed April 14, 1905. Serial No. 255,575.

*To all whom it may concern:*

Be it known that I, CHARLES F. LANCASTER, a citizen of the United States, residing at Petoskey, in the county of Emmet and State of Michigan, have invented certain new and useful Improvements in Molding Apparatus, of which the following is a specification.

This invention consists of a novel apparatus for building hollow or solid walls of cement, concrete, or plastic material, the intent of the invention being to provide means of this class adapted to construct the wall by molding the same in sections.

In its general organization the invention comprises a support which is preferably a framework or scaffolding, a platform adjustably mounted upon the support, and a mold or molds carried by the platform and adjustable thereupon for molding the wall in sections.

The invention contemplates also the provision of a peculiar form of mold in connection with special supporting means therefor, such supporting means being adjustable upon the platform of the main scaffold or framework support, so that the mold may be advanced along the wall in molding portions in the building operation.

For a full description of the invention and the merits thereof and also to acquire a knowledge of the details of construction of the means for effecting the result reference is to be had to the following description and accompanying drawings, in which—

Figure 1 is a perspective view of an apparatus embodying the essential features of the invention. Fig. 2 is a perspective view of one of the corner-molds detached. Fig. 3 is a perspective view of one of the main molds carried by the scaffold or support detached therefrom. Fig. 4 is a vertical sectional view of one of the movable molds and parts of the carriage supporting the same. Fig. 5 is a perspective view of one of the braces. Fig. 6 is a detail horizontal sectional view showing the movable and corner molds of the scaffold. Fig. 7 is a detail view of the means for supporting the corner-molds. Fig. 8 is a perspective view of a modified form of mold, such as used near casings. Fig. 9 is a detail perspective view of one of the corner-mold clamps. Fig. 10 is a horizontal sectional view of the scaffold, molds omitted. Fig. 11 represents side views of the adjustable mold-supporting members detached. Fig. 12 is a vertical sectional view on the line X X of Fig. 4.

Corresponding and like parts are referred to in the following description and indicated in all the views of the drawings by the same reference characters.

Referring to the drawings, the support or scaffold included in the apparatus comprising this invention is composed of a plurality of vertical uprights or posts 1, which may be arranged to provide an approximately rectangular framework, certain of the posts 1 being located at the corners and others at intermediate points in the sides of the framework, as found desirable and necessary under actual working conditions. It is preferred that the parts of the support or scaffold be made of metal, and the posts 1 are preferably of T form in cross-section, being connected together by means of transverse truss-bars 2, suitably braced, as shown at 3. Horizontal bars 4 connect the upper extremities of the posts 1, and said bars, as well as the members 2, are preferably made from angle-iron to lend the utmost rigidity, as well as lightness, to the structure. The heads $1^a$ of the posts 1 are outermost and have the vertical edges thereof notched at intervals, as shown at $1^b$. Brackets 5 are mounted for vertical movement upon the posts 1, and said brackets comprise vertical standards $5^a$, and horizontal arms $5^b$ project laterally from the lower extremities of the standards. Attached to the upper end portions of the standards $5^a$ of the brackets 5 are sleeves 6, adapted to receive the head portions $1^a$ of the posts 1, so as to secure the brackets 5 thereto and direct said brackets in their vertical movement relative to the posts in adjusting the latter. Pivoted to the sides of the standards are dogs 7, adapted to engage at their upper ends with the notched portions $1^b$ of the posts 1 to hold the brackets 5 fixed at an ascertained adjustment upon the scaffold or framework. Held between the lower extremities of each pair of dogs 7 is a spring 8, which normally holds the dogs in engagement with the posts 1, said dogs, however, being adapted to ride upwardly along the notched portions $1^b$ of the posts in raising the brackets 5. The horizontal arms $5^b$ of the brackets 5 support a platform 9, said platform being composed of a floor board or boards and extending entirely around the scaffold or framework if the latter is of rectangular or similar form, as illustrated. The floor-boards of the platform 9 may have a miter-joint at the corners, the arms 5ᵇ of course projecting from the framework-posts 1 at the corners, as shown. Stringers 10 are preferably supported at the inner and outer portions of the arms 5ᵇ, the platform-boards resting directly upon said stringers, which are made, preferably, of angle-plates. The stringers 10 may be connected at intervals by means of transverse truss-plates 11, the extremities of which extend upwardly, as shown at 11ᵃ. A clamp-bar 12 is pivoted between its ends, as shown at 13, to each of the plates 11, and the ends of the bar 12 engage over the lower wing of the stringers 10, whereas the end portions of the plates 11 bear against the stringers 10 from the under and outer sides. The clamp-bar 12 may be held in positive engagement with the stringers by means of small hooks 14 upon the ends thereof. The outermost of the stringers 10 constitutes a rail or a track upon which a carriage 15 is mounted, said carriage supporting the mold or molds forming a part of the apparatus. Above the outer stringers 10 and approximately in vertical alinement therewith are mounted rails 16, the latter being supported in spaced relation to the platform 9 by means of sleeves 17, receiving bolts or like members 18, which pass through the outer extremities of the arms 5ᵇ of the brackets 5 and also through the rails 16 above mentioned.

The carriage 15, which carries the mold 19, is composed of a frame consisting of side bars 15ᵃ, connected at the lower extremities by a bar or plate 15ᵇ, braces 15ᶜ connecting the members 15ᵃ and 15ᵇ. Plates 20 are attached to the lower extremities of the sides 15ᵃ of the carriage-frame, and end portions of these plates are spaced from the said sides, so that the rails or outer stringers 10 will be received at the upper portions in the space between the members 20 and 15ᵃ. The carriage is primarily supported, however, by integral hooks 21, projecting from the upper extremities of the sides 15ᵃ and engaging over the rail 16. The weight of the carriage is supported upon the rail 16 principally, and the members 20 constitute guide members for holding the carriage in proper vertical position as the same moves along the track upon which it is mounted. A pivot-bar 22 passes through the side portions 15ᵃ of the frame of the carriage, the ends of said bar projecting outwardly from the ends of said side members 15ᵃ. Supporting members 23 are pivoted at their lower extremities to the outer projecting ends of the pivot-bar 22, and said supporting members directly carry the mold, which is adjustably mounted thereon. The supporting members 23 are connected together at their upper end portions by a transverse bar 24, suitably attached thereto, and the said supporting members 23 embody spaced ears, between which are mounted vertically-movable bars. The bars 25 move between the sides of the members 23, and said bars are of approximately U form in cross-section. Each of the bars 25 is provided with a rack-bar 26, which is rigidly applied thereto in the hollow portion thereof, and the teeth 27 of each rack-bar are in mesh with a pinion 28. The pinions 28, which engage the racks 26, are mounted upon a shaft 29, which passes through openings in the sides of the supporting members 23, said openings forming bearings for the shaft in a manner which will be obvious. The shaft 29 extends entirely across the frame of the carriage, and one end of the shaft, which projects beyond the side of the carriage, has a crank-handle 30 applied thereto, by which the shaft may be revolved to rotate the pinions 28. Pivoted hooks 31 are mounted upon the transverse bar 24 at the upper portion of the frame of the carriage 15 near the ends of said bar, and these hooks are adapted to engage over the hooks 21, which coöperate with the rails 16 to hold the supporting members 23 in vertical position relative to the carriage-frame. It will be readily seen that the hooks 31 may be disengaged from the hooks 21, so as to permit outward tilting movement of the supporting members 23, for purposes which will appear more fully hereinafter. The hooks 31 each comprise a shank pivoted to the member 24 at one end and slotted lengthwise thereof, as shown at 32, to receive the threaded stem of an adjustable engaging member 33, which forms a part of the hook and which is secured by a suitable nut or the like. Set-screws 34 pass through the member 24 near its ends, the outer extremities of the screws having heads and the inner extremities being adapted to bear against the rear or outer sides of the side bars 15ᵃ of the carriage-frame. By adjusting the screws 24 and the members 33 of the hooks 31 the supporting members 23 may likewise be adjusted toward and from the carriage 15, so that the bars 25 may be adjusted for the purpose of alining the same, this being necessary, since these bars 25 carry the mold, and under certain conditions of service, wear, or the like the bars 25 may get out of plumb, which would be disadvantageous in properly building the wall.

Describing the mold parts included in the invention, sleeves 35 are attached to the vertically-movable bars 25, preferably near the upper portions of the latter, said sleeves being rigidly secured in any suitable way. Each of the sleeves 35, one of which is provided for each member 25, is formed with an integral horizontal socket member 36, in which are mounted a plurality of horizontal arms 37, 38, 39, and 40. A set of the arms 37, 38, 39, and 40 is carried by each bar 25. These arms support the sides 41 and 42 of the mold, as well as the core portions 43 and 44. The sides 41 and 42 and the core members 43 and 44 of the mold are directly attached to vertical downwardly-projecting extensions 45, one of which is provided at the outer extremity of each of the arms supporting the mold parts aforesaid. The arms in the socket members 36 are preferably mounted therein, and all of the arms above described are used in building hollow walls or those having an intermediate air-space. In building solid walls, however, the arms 38 and 39 are dispensed with, said arms carrying the core sides of the mold, which would not be used in this instance, and when the arms 38 and 39 are not utilized the space in the socket members 36 which would be occupied thereby will be filled with a suitable filling block or piece. It will be noted that the arms which carry the mold parts project laterally from the bars 25 and also from the platform 9 of the main scaffold or framework carrying the mold. It will thus be seen that in practical operation, the scaffold or framework having been positioned with reference to the place at which the wall is to be constructed, the wall may be readily built at one side of the scaffold convenient thereto for all purposes. The various mold parts 41, 42, 43, and 44, which are supported near each end by means of the extensions 45, are adapted to be actuated in order to facilitate displacement of said parts from the section of the wall which has just been molded thereby. For the above purpose a lever 46 is carried by each socket member 36 and operably connected with the several arms 37, 38, 39, and 40 for actuation thereof. Each lever 46 is provided at one end with a handle, and a pivot-stud 47 projects laterally from said lever between the ends thereof. The pivot-stud 47 is received in an opening in the outer side of the adjacent socket member 36. Below the stud 47 and projecting laterally from the lever 46 from the same side is a pin 48, which passes through openings 49 in the arms 37 and 38. A second pin 50 projects also from the lever 46 above the stud 47, and this pin passes through arcuate slots 51 in the arms 37 and 38 and enters openings 52 in the arm 39. The pin 50 is somewhat longer than the pin 48, since said pin 50 passes through three of the arms supporting the mold parts, whereas the pin 48 only passes through two of them. The lever 46 is thus connected with three of the arms—namely, 37, 38, and 39—by means of the pins 48 and 50. Said lever 46 is connected with the arm 40, however, by means of a link 53, the outer extremity of which is pivoted to the arm 40, as shown at 54, the opposite extremity having a plurality of openings 55, through which any one of a series of lugs 56, extended through the lever 46, may pass. The arms 37 and 38 are formed with a plurality of the openings 49 and the slots 51, the arm 39 having a plurality of the openings 52, the above being provided to enable the arms 37, 38, and 39 to be adjusted with relation to the parts connecting the same with the lever 46 to enable the mold parts to be likewise adjusted in building walls of different thicknesses and with air-cavities of different sizes. The connection between the levers 46 and the arms 40 is of the peculiar nature above described, for the reason that in molding broken stone on any work, such stone projecting beyond the plumb face of the wall, the arm 40 may permit opening of the moldboard 4 sufficiently far to readily disengage from the outer surface of the molded section of the wall. The sides 41 and 42 of the mold have a lug 57 projecting downwardly therefrom at the ends, and the lugs 57 at the ends of the mold coöperate with hook extensions 58 of ends 59, two of which are provided for the mold, as is customary in devices of this class. The ends 59 are detachably secured to the sides of the mold and will be made in various sizes to accommodate for different adjustments of the sides in building walls of different thicknesses. Each lever 46 is held in place by a pivoted latch-plate 60, which is pivoted to a side of the adjacent socket member 36, the inner face of each latch-plate 60 having a depression or recess 61 near its outer end. The depression or recess 61 of the latch-plate 60 is adapted to receive a projection 62, extending outwardly from the lever 46 adjacent approximately in line with the pivot-stud 47 and upon the side of the lever opposite that from which the pivot-stud extends. When the latch-plate 60 is engaged with the projection 62 of the lever, said lever is held with the members 48 and 50 in engagement with the arms with which they coöperate; but it will be noted readily that the levers 46 may be quickly displaced or removed to permit of adjustment of their connection with regard to the arms 37, 38, and 39.

With regard to the operation of the mold parts, when the levers 46 are rocked in the direction of the arrow $a$ the arms 37 and 38 will be moved in the opposite direction, being actuated by the pins 48 of the levers. The above will cause the mold side 41 and the core side 44 to move toward the mold side 42. Simultaneously with the movement of the arms 37 and 38 the pin 50, which passes through the slots in the arms 37 and 38, will pull the arm 39 and the mold part 43 toward the side 41, the connection 53 at the same time moving the mold side 42 toward the mold side 41. The ends 59 may now be placed in position and the plastic material suitably tamped in the space between the parts 41 and 43 and 42 and 44 to make a hollow section of the wall. To remove the mold parts away from the molded section, the lever 46 is rocked in the direction opposite the arrow $a$, such movement pulling the mold parts 41 and 44 toward the carriage 15 and simultaneously forcing the mold parts 43 and 42 in a direction away from the carriage, permitting the mold to be shifted preparatory to molding another section of the wall. Before actuating the lever, as last described, the ends will of course have been removed.

In molding the corner-sections of the wall the mold parts are constructed of angular formation, as shown in Fig. 6, so that the corner may be constructed accurately and expeditiously. When the corner-mold is used, a single set of the arms 37, 38, 39, and 40 are utilized, said arms being carried by a single bar 25, adjustable in substantially the same manner as before described. The bar 25, however, is actuated by a pinion 63, carried by a short shaft 64, journaled in a single one of the supporting members $32^a$ of substantially the same construction as the members 23 before described. A carriage is dispensed with for the corner-mold parts, though the same are vertically adjustable, a supporting member 23 being directly attached to a bracket-plate 65, having hooks 66 adapted to engage over the rail 16 at the corner of the scaffold. It is preferred to use reinforcing-clamps in connection with the corner-mold parts, and said clamps embody a bar 67, upon which are mounted a plurality of clamp members 68 and 69. Three of the members 69 are used, each being pivoted between its ends, as shown at 70, to the bar 67. The clamp member 68, however, is rigidly secured to the bar 67. Toggle-links 71 connect the member 68 with the adjacent member 69, similar toggle-links 72 connecting the other two clamp members 69. An actuating-lever 73 is pivoted at one end, as shown at 74, to the bar 67, and said actuating-lever is connected at points between its ends with the toggle-links 71 and 72 at the points of connection (indicated at 75) of said links. The members 69 are adapted to be adjusted upon the bars 67, said bars having a plurality of openings 76 to receive the pivots of the members 69, the adjustment of the members 69 being necessary in order that a clamp device may be applied to brace mold parts adjustable for molding walls of different thicknesses. An attaching-hook 77 is secured to the bar 67 by means of a set-screw 78 or the like, said hook 77 being adapted to secure the clamp device to the rail 16, so that the clamp members 68 and 69 will engage with sides of the mold parts used at the corners of the wall.

Though the clamp devices as above described are preferably used to brace mold parts, yet the clamp members 68 and 69 of two of these clamp devices are adapted to have detachable mold parts, (indicated at $41^a$, $42^a$, $43^a$, and $44^a$,) equivalent with the parts 41, 42, 43, and 44, before described, secured thereto by means of pivot-hooks 79, which may be carried by the parts $41^a$, $42^a$, $43^a$, and $44^a$ to engage in openings in the members 68 and 69. When two clamp devices for the mold parts aforesaid are secured thereto, suitable end pieces, such as 59, may be applied to the mold parts, and a mold is secured which may be attached to the rail 16 and used in molding short sections of the walls between windows at odd corners and curves, for instance.

Another feature of the invention resides in the provision of a special form of awning in connection with the supporting-scaffold, so as to conduce to the comfort of the workmen working thereon and at the same time serve as a covering for the wall. It is well known that in molding plastic material the best results are produced by permitting the mold to dry slowly, such results being attained by the use of the awning or covering above mentioned. Further, it is always necessary that a newly-molded wall shall be covered during a rain, the provision of an awning being advantageous for this purpose also. The awning used consists of a frame 80, having the covering or body of the awning (indicated at 81) applied thereto. Ends of the frame 80 may be projected to form extensions 82, which are adapted to be received in the sleeves 6 of the standards $5^a$ of the main platform-supporting brackets 5. It will be seen that the awning 80 is located to afford a protection for the wall, said awning being arranged above the platform 9 and the molding appartus supported by the carriage 15. The awning is readily removable and, further, is adjustable with the platform.

Describing the general operation of the apparatus hereinbefore set forth the scaffold or main support embodying the uprights 1 is positioned properly with reference to the place where the wall is to be built, the parts of the support being arranged in plumb in order that the wall may be constructed likewise. The awning 80 is placed in position and the carriage 15, which carries the mold parts, is adjusted preparatory to building the first section of the wall. The carriage 15 having been adjusted, as well as the mold parts supported thereby, plastic material is placed within the mold and struck off in the customary manner. The mold parts may then be operated so as to space the same from the molded section, and the carriage is now moved along the track 16 preparatory to molding a second section, the operation being continuously carried on in this way. When the mold parts have been operated preparatory to spacing the same from the section molded, the crank 30 may be turned so as to raise the vertically-movable bars 25 and elevate the mold parts to permit the same to be moved with the carriage to another side of the platform 9 and again lowered for the second molding operation. Should a window-casing or like part in the length of the wall interfere with the longitudinal movement of the mold along the platform 9, the hooks 31 are disengaged from the hooks 21 and the supporting members 23 are pulled rearwardly, this action tilting the mold inwardly from the platform 9 and permitting the carriage 15 to be moved past the casing or other projecting part, after which the hooks 31 may be again engaged with the hooks 21 to hold the mold parts in proper position for further molding operations. When a layer or course of sections of the wall have been molded, the platform 9 is raised bodily to adjust the same with the mold convenient to the next higher course or layer of sections. The above may be done by connecting block and tackle with the uppermost bars 4 of the framework or scaffold and connecting said tackle with the platform or brackets 5 to raise the latter until the dogs 7 engage the next higher notches in the length of the posts or uprights 1.

The bars 4, above mentioned and which are preferably made of angle-irons, as described hereinbefore, are so joined at the corners, as shown most clearly in Fig. 1, as to form a continuous track around the framework at the upper portion, this construction facilitating the operation of elevating the platform 9, in which a chain block may be hooked over the bars 4, and the workmen by walking along the platform 9 may draw the hook along the track formed by said bars, past the cornerposts, and past any intermediate posts which may be provided to a point directly above the part of the platform to which the block may be coupled. The advantages of the above are obvious. The bars 4 are supported by small brackets $4^a$, comprising angle-plates, which are attached to the part 1 of each upright just below the bars, holding the latter in rigid position and forming the continuous track above described.

Having thus described the invention, what is claimed as new is—

1. In a molding apparatus for building walls, the combination of a scaffold or support, a mold carried by the scaffold and movable horizontally thereon to be advanced lengthwise of the wall in construction, and means for moving said mold transverse to the line of its movement above mentioned to admit of passage of obstructions in the length of the wall.

2. In a molding apparatus for building walls, the combination of a scaffold, a platform vertically adjustable upon and at one side of the scaffold, a carriage movable along the platform, and a mold mounted on the carriage.

3. In molding apparatus for building walls, the combination of a scaffold, a track adjustable vertically upon the scaffold, and a mold movable along the track and arranged to be tilted bodily.

4. In molding apparatus for building walls, the combination of a scaffold or like support, a track upon said scaffold, a carriage mounted upon the track, a mold composed of parts movably mounted upon the carriage, and means for bodily moving the mold transversely of the track to avoid obstructions in the length of the wall.

5. In molding apparatus for building walls, the combination of a scaffold or like support, a track upon said scaffold, a carriage mounted upon the track, a mold movably mounted upon the carriage, and means for tilting the mold independently of the carriage.

6. In molding apparatus for building walls, the combination of a scaffold, a track upon the scaffold, a carriage mounted upon the track, a mold carried by the carriage, means for moving the mold vertically, and means for tilting the mold laterally with respect to the line of travel of the carriage.

7. In molding apparatus for building walls, the combination of a scaffold, a mold carried by the scaffold, means for moving the mold horizontally and vertically, and means for tilting the mold laterally with respect to the line of its horizontal movement.

8. In molding apparatus for building walls, the combination of a scaffold, a vertically-movable mold carried by the scaffold, and means for tilting the mold.

9. In molding apparatus for building walls, the combination of a scaffold, and a vertically-movable mold pivotally mounted upon the scaffold.

10. In a molding apparatus for building walls, the combination of a scaffold, a vertically-movable platform mounted upon the scaffold, a carriage movable along said platform, vertical bars movably mounted on the carriage, means for actuating said bars, arms projected laterally from the bars aforesaid, supporting members supporting the arms upon the bars and embodying socket members receiving the arms, and operating means carried by each supporting member aforesaid for actuating the arms.

11. In molding apparatus for building walls, the combination of a scaffold, a support movable vertically of the scaffold, and a mold vertically movable upon the support.

12. In molding apparatus for building walls, the combination of a scaffold, a vertically-movable platform carried by the scaffold, a vertically-movable mold upon the platform, and means for tilting the mold.

13. In molding apparatus for building walls, the combination of a scaffold, a carriage movable upon the scaffold, and a mold pivoted so as to be tilted bodily on the carriage.

14. In molding apparatus for building walls, the combination of a scaffold, and a mold pivoted to the scaffold.

15. In molding apparatus for building walls, the combination of a scaffold, a vertically-movable platform mounted upon the scaffold, a carriage movable along said platform, vertical bars movably mounted on the carriage, means for actuating said bars, arms projected laterally from the bars aforesaid, supporting members supporting the arms upon the bars and embodying socket members receiving the arms, and a lever pivoted to each supporting member and operably connected with each arm for actuation thereof, as specified.

16. In molding apparatus for building walls, the combination of a scaffold, a track carried by the scaffold, a carriage movable along the track, vertical bars supported by the carriage, means for actuating said bars, arms projected from the bars, a lever for moving said arms, and mold parts carried by said arms.

17. In molding apparatus for building walls, the combination of a scaffold, a track carried by the scaffold, a carriage movable along the track, vertical bars supported by the carriage, means for actuating said bars, arms projected laterally from the bars aforesaid, levers adjustably connected with said arms, and mold parts carried by the arms and adapted for actuation by the levers aforesaid.

18. In molding apparatus for building walls, the combination of a scaffold, a track carried by the scaffold, a carriage movable along the track, vertical bars supported by the carriage, means for actuating said bars, arms projected laterally from the bars aforesaid, means for adjusting said arms, mold parts carried by the arms to vary the normal operative positions thereof, and means for actuating the arms to impart movement to the mold parts.

19. In molding apparatus for building walls, the combination of a scaffold, a track carried by the scaffold, a carriage movable along the track, vertical bars supported by the carriage, means including rack-and-pinion devices for actuating the bars aforesaid, a mold supported by the bars and composed of mold parts, and means adjustably connected with the mold parts for actuation thereof.

20. In molding apparatus for building walls, the combination of a scaffold, a track upon the scaffold, a carriage upon the track, supporting members connected with the carriage and adapted for tilting movement, vertically-movable bars carried by the supporting members, means for actuating the bars, and mold parts carried by said bars.

21. In molding apparatus for building walls, the combination of a scaffold, a track upon the scaffold, a carriage upon the track, supporting members connected with the carriage and adapted for tilting movement, vertically-movable bars carried by the supporting members, means for actuating the bars, arms extending laterally from the bars, mold parts pendent from said arms, and means for actuating said arms to impart movement to the mold parts.

22. In molding apparatus for building walls, the combination of a scaffold, a track upon the scaffold, a carriage movable along the track, supporting members pivoted to the carriage, vertically-adjustable arms carried by the supporting members, hook devices for holding the supporting members in a predetermined position, means for actuating the vertically-movable bars, and mold parts carried by the vertically-movable bars.

23. In molding apparatus for building walls, the combination of a scaffold composed of a plurality of uprights, brackets movably mounted upon the uprights, dogs carried by the brackets to hold the same at a predetermined adjustment, a track supported by the brackets, a carriage movable upon the track, and a mold mounted upon the carriage.

24. A mold for building walls, comprising a plurality of arms, mold parts carried by said arms, a socket member receiving the arms, and a pivot-lever operably connected with the arms for actuation thereof.

25. In combination, a socket member, a plurality of arms passing through the socket member, mold parts carried by the arms, a lever pivoted to the socket member, and pins projected from the lever and operably connected with the arms for actuation thereof.

26. In combination, a socket member, a plurality of arms passing through the socket member, mold parts pendent from the arms, a lever pivoted to the socket member, pins projected from the lever and operably connected with the arms for actuation thereof, and a latch pivoted to the socket member to hold the lever in operative position.

27. In combination, a mold embodying movable sides, a clamp for the mold comprising a bar, a plurality of clamp members pivoted to the bar, and a lever operably connected with said clamp members.

28. In combination, a mold embodying movable sides, a clamp for said mold comprising a bar, a plurality of clamp members pivoted to the bar, toggle-links connecting certain of said members, and a lever pivoted to the bar and operably connected with the toggle-links aforesaid.

In testimony whereof I affix my signature in presence of two witnesses.

CHARLES F. LANCASTER. [L. S.]

Witnesses:
SUSAN MCLEAN,
JAMES A. DART.